Oct. 24, 1939.    H. H. C. PETERS    2,177,329
DOUGH FOLDING DEVICE
Filed Dec. 19, 1938

Inventor
H. H. C. Peters
By C. F. Wenderoth
Attorney

Patented Oct. 24, 1939

2,177,329

UNITED STATES PATENT OFFICE 2,177,329

DOUGH FOLDING DEVICE

Hendrik Herman Christiaan Peters, Rotterdam, Netherlands

Application December 19, 1938, Serial No. 246,744
In the Netherlands December 22, 1937

4 Claims. (Cl. 107—9)

My invention relates to a device for folding over the sides of dough sheets.

Such devices are used in loaf forming machines. Many devices for folding over the sides of dough sheets have been proposed.

The main object of the invention is to provide novel, efficient and very simple means for folding over the sides of pieces of dough.

Another object of the invention is to provide means for folding over sides of dough pieces such that these sides do not rebound after the folding operation.

With the above and other objects in view the invention consists in a device embodying the novel and improved features, hereinafter described and particularly pointed out in the claims. The advantages will be readily understood and appreciated by those skilled in the art.

In the drawing only the essential parts of the novel device have been represented.

Figure 1:
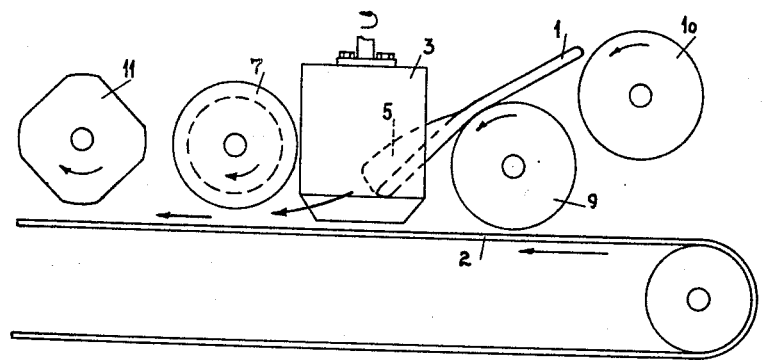
Figure 1 is a side elevation of the device.

Pieces or sheets of dough 1, which usually have been preformed to pieces of a somewhat trapezoidal shape, are fed to the device along guiding means formed by rollers 9 and 10 the axes of which are substantially parallel to the endless carrier 2. The rollers 9 and 10 however are so mounted that each sheet of dough reaches rollers 3 at an angle to the surface of the carrier 2, in other words the sheet of dough when arriving at the rollers 3 is not yet in a flat condition on the carrier 2.

This and the fact that the rollers 3 have their axes substantially perpendicular to the carrier 2 and are suitably distanced with respect to the dough sheet, causes the dough sheet when passed between the rollers 3 to assume the shape of a gutter, the sides 5 and 6 of the piece of dough forming the flanges of the gutter.

It is to be noted that instead of the rollers 9 and 10 any suitable other kind of guiding means, e. g., an endless band in an inclined position may be used.

Upon advancing along its course the dough piece passes two rollers 7 and 8 having their axes parallel to the carrier surface.

The rollers 3 and 4 have converging (in this case conical) lower ends so that the sides 5 and 6 are somewhat bent towards the upper surface of the dough sheet. The rollers 7 and 8 have conical parts pointing towards each other for completing the folding action. The latter rollers are placed as near as possible to the rollers 3 and 4 in order to avoid rebounding of the bent sides 5 and 6.

These sides of the dough piece are of a rather springy nature.

Each roller 7 or 8 has a cylindrical part 7a, 8a respectively and a conical part 7b, 8b respectively joining said cylindrical part.

Figure 2:
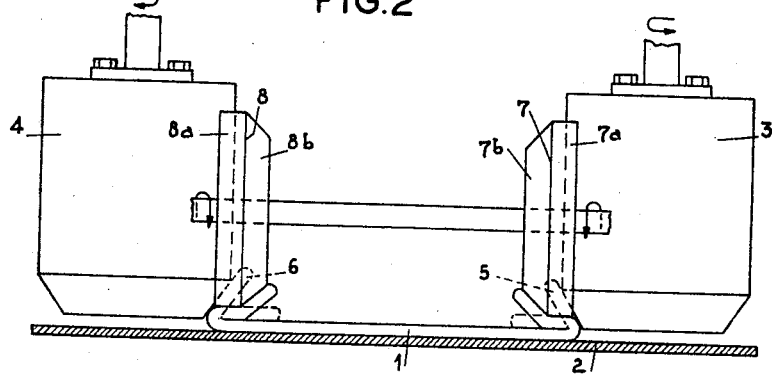
Figure 2 is a front view of a part of Figure 1.

The folding action has been illustrated in Figure 2.

After having passed the rollers 7 and 8 the sides 5 and 6 are further pressed on to the dough sheet by means of a non-cylindrical or polygonal roller 11.

When leaving the roller 11 the thus folded sheets may be conveyed to a coiling device, which does not form a part of this invention and has not been illustrated.

It is to be understood that the invention is not limited to the particular construction and arrangement of parts of the illustrated embodiment of the invention, but that the invention may be embodied in other forms within the scope of the claims.

So for instance the work done by the sets of rollers 3 and 4 or 7 and 8 may be distributed over more than one roller, arranged side by side along the course of the dough sheets, but at any rate in the drawing a very simple and yet efficient embodiment of the invention is illustrated.

Having explained the nature and objects of the invention, what I claim is:

1. In a device for folding over the sides of dough sheets, a movable carrier defining the course for said sheets, a pair of rollers having their axes substantially perpendicular to the general course of said sheets, one roller of said pair being mounted at each side of said course and above said carrier, said rollers being spaced from said course for molding the sheet to a gutter-like form, means for guiding said sheets at an angle to said carrier to said rollers, a second pair of rollers having their axes parallel to said carrier, one roller of said second pair being mounted at each side of the course of the pieces of dough closely adjacent and behind said first pair of rollers, said second pair of rollers being profiled to fold over the sides of the gutter-like piece of dough and press said sides on said piece of dough.

2. A device as set forth in claim 1 in which said rollers having their axes perpendicular to the course of the pieces of dough have converging lower ends.

3. A device as set forth in claim 1 in which said rollers having their axes parallel to the carrier have converging portions at their adjacent sides.

4. A device as set forth in claim 1 in which said rollers having their axes perpendicular to the course of the pieces of dough have converging lower ends and said rollers having their axes parallel to said carriers have converging portions at their adjacent sides.

HENDRIK HERMAN CHRISTIAAN PETERS.